April 19, 1932. A. DINA 1,854,504
FRAMING MECHANISM
Filed Dec. 12, 1927 4 Sheets-Sheet 1
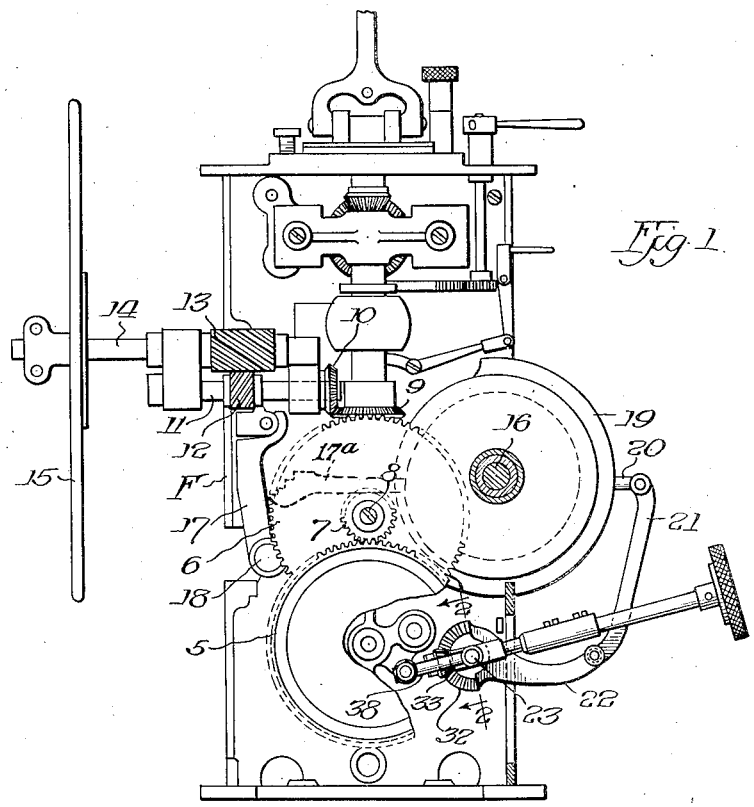
Fig.1
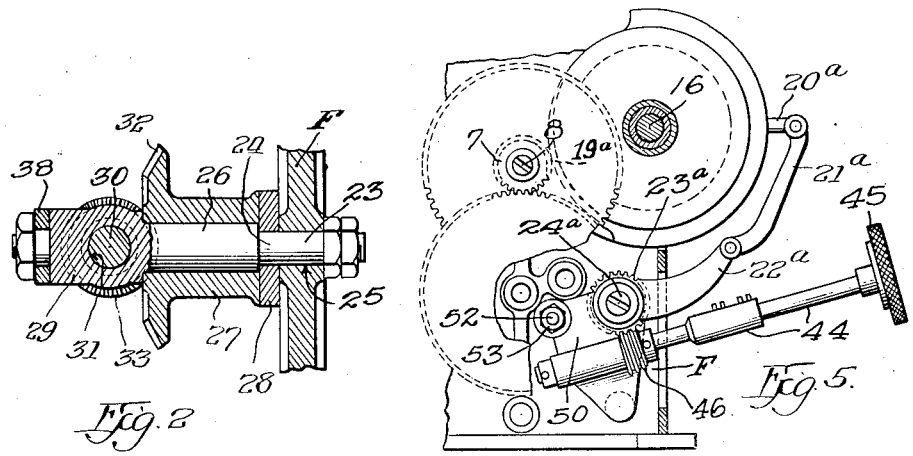
Fig.2
Fig.5.
Witness:
Inventor
Augusto Dina
By attorney April 19, 1932. A. DINA 1,854,504
FRAMING MECHANISM
Filed Dec. 12, 1927 4 Sheets-Sheet 2
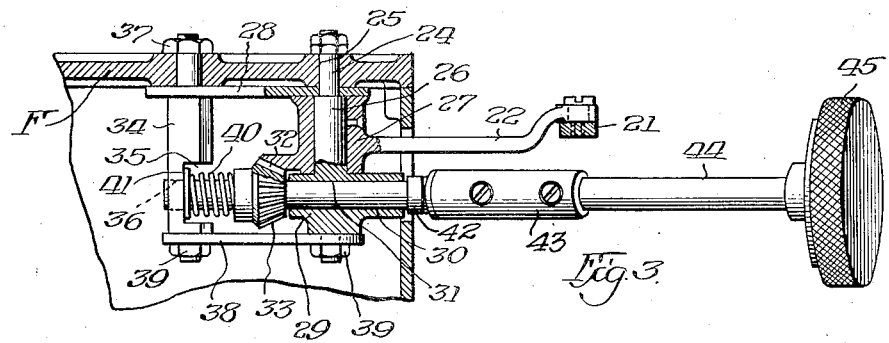
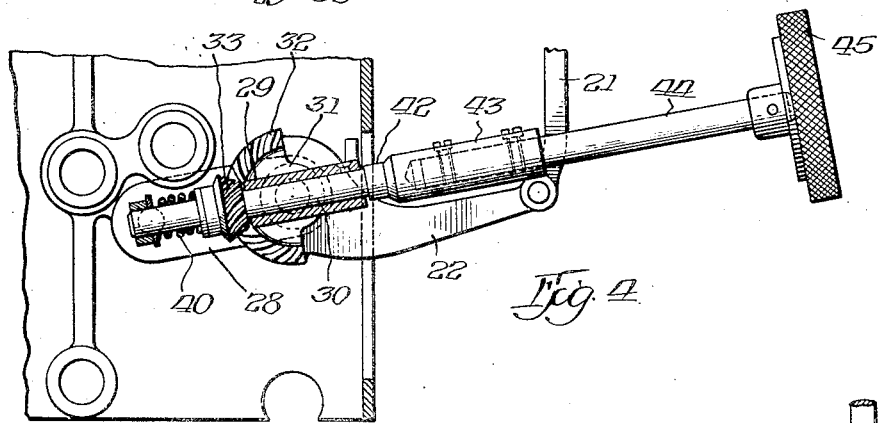
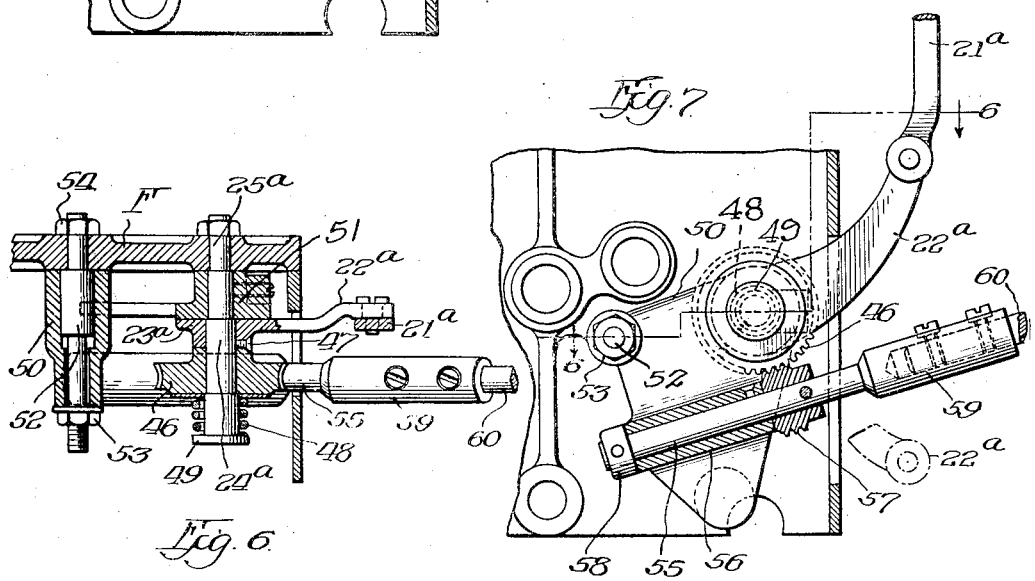

April 19, 1932.  A. DINA  1,854,504

FRAMING MECHANISM

Filed Dec. 12, 1927  4 Sheets-Sheet 3

Witness:
Fred E. Burns

Inventor:
Augusto Dina
by attorney
Paul Carpenter

April 19, 1932.  A. DINA  1,854,504
FRAMING MECHANISM
Filed Dec. 12, 1927  4 Sheets-Sheet 4

Patented Apr. 19, 1932

1,854,504

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

FRAMING MECHANISM

Application filed December 12, 1927. Serial No. 239,307.

The invention relates broadly to motion imparting and translating devices, and more particularly to an improved adjusting means adapted for employment in operating the framing mechanism of a motion picture apparatus.

This invention is described and illustrated as part of and for the purpose of imparting the required movement to the framing mechanism of a motion picture projector, though the present invention finds a wide field of utility for other purposes.

This invention is applicable to the framing mechanism described and claimed in my Patent No. 1,746,385, and is in part a continuation in part of my Patent No. 1,834,205, issued December 1, 1931.

This application discloses, among other things, the subject matter of Figures 1 to 9 of Patent No. 1,834,205.

In the framing mechanism of my Patent, 1,746,385, a lever is employed both for manipulating the framing mechanism and for synchronizing the shutter with the "frame," and it is one of the principal objects of the present invention to shorten the required stroke or range of movement of the said operating lever, in one form of this invention the lever stroke being reduced, and in another form a revoluble adjusting device being substituted for the lever, though the basic features are the same.

The principal objects and advantages of this invention reside in the provision of an improved motion imparting mechanism characterized by the provision of means for obtaining a predetermined displacement of certain elements with a minimum displacement of certain other elements; the provision of an improved means for operating the framing mechanism of a motion picture projector; the provision of an improved means for operating the framing and shutter compensating mechanisms of a motion picture projector; the provision of an improved lever operating mechanism; the provision of an improved means of the character described, which is interchangeable with various mechanisms; and the provision of an improved means for translating or transmitting motion of predetermined extent to an element and including motion reducing means.

This invention is further characterized by the provision of means in a motion picture projection apparatus for operating the framing and shutter compensating mechanisms from the rear of the machine so that this operation may be conveniently performed by the operator; the provision of a mechanism of the character referred to wherein the moving parts thereof are operable to a large degree in one vertical plane, thus reducing the space taken up by the apparatus; and the provision of a device of the character described in which the means for operating the framing mechanism may be removed substantially as a unit for repair, replacement or adjustment.

The foregoing and such further objects and advantages as may appear or be pointed out as this description proceeds are attained in the structural embodiment illustrated in the accompanying drawings; in which:

Figure 1 is a side elevational view of a motion picture projector embodying the improvements of this invention;

Figure 2 is an enlarged sectional view taken on the line 2—2 of Figure 1, looking in the direction indicated by the arrows;

Figure 3 is an enlarged fragmentary top plan view, parts in section, of the device of Figure 1;

Figure 4 is an enlarged fragmentary side elevational view of the device shown in Figure 3;

Figure 5 is a fragmentary view similar to Figure 1 of an alternative form of this invention;

Figures 6 and 7 are views similar to Figures 3 and 4, further illustrating the device of Figure 5;

Figure 8:
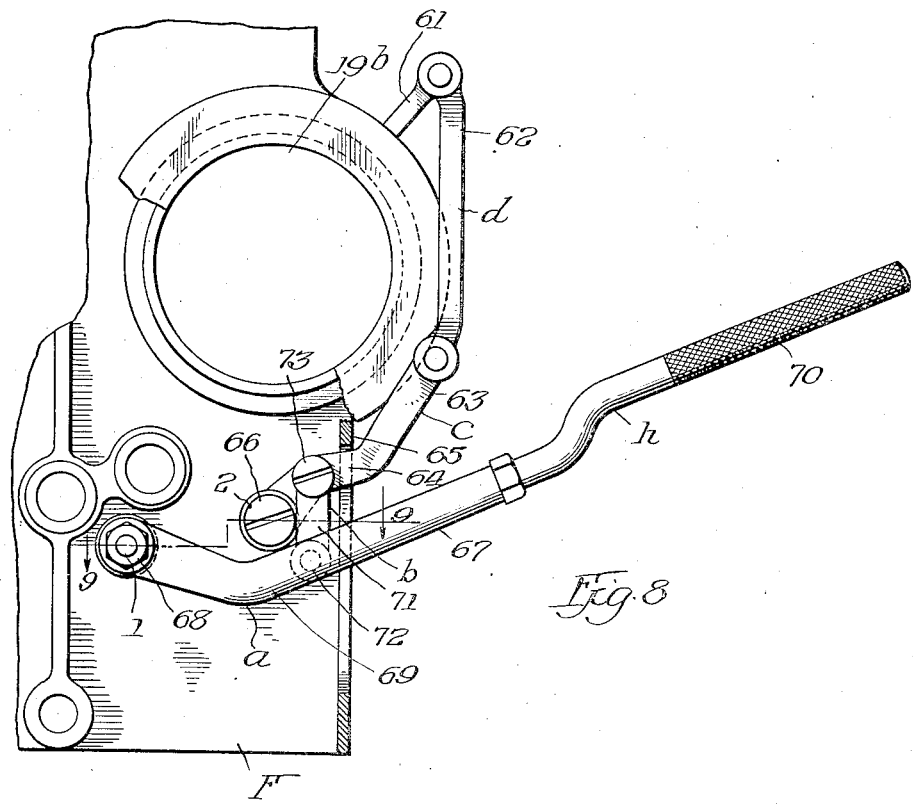
Figures 8 and 9 are fragmentary elevational and transverse sectional views, respectively, illustrating an alternative form of my invention applied to a prior art device, that is, to the frame, gear box and lever bearings of a motion picture projector.

Referring now more particularly to the drawings, and first to Figures 1 to 4, I have illustrated, as in Figure 1, a form of motion picture projector in which the present invention finds particular utility, the frame F serving to support the various parts of the projector, this description pertaining only to such parts as may be pertinent and necessary to a clear understanding of this invention.

Parts of the projector mechanism are, of course, omitted, the essentials for a complete understanding of this invention including in part the gear train shown in Figure 1 and including the gears 5, 6, these gears being operatively connected by a pinion 7 on the shaft 8 of the gear 6.

The gear 6 is in mesh with the bevel pinion 9, which in turn drives a bevel pinion 10 mounted upon and serving to drive a countershaft 11. This countershaft carries a worm or spiral gear 12 which meshes with a complemental spiral gear 13 on the shutter shaft 14, which latter carries the shutter 15 of an approved type usually employed for preventing flicker in motion pictures projected by the apparatus. Those skilled in the art will understand that the shutter must operate synchronously with the film feeding sprocket (not shown), but which in the machine shown would be mounted upon the shaft 16.

In order that the shutter be synchronized with a "frame" of the picture, it is necessary that the shutter be given a partial rotation independently of its rotation by virtue of the normal operation of the shaft on which it is mounted, and to this end I provide the spiral gearing 12—13, whereby a partial rotation may be imparted to the gear 13 by sliding the gear 12 on its shaft 11. The lever 17 is actuated by a plunger 17a moved by a cam 19a (see Figs. 1 and 5) on the means hereinafter described for operating the framing mechanism.

The framing mechanism includes here the casing 19, the details of the framing means being omitted, said casing having a portion thereof carrying a part of the intermittent couple (not shown) displaceable to impart a partial rotation to the film feeding sprocket and thus accomplish the framing operation. Reciprocation of the plunger 17a by the cam 19a actuates lever 17 to operate the shutter with the framing mechanism.

In the form of the invention shown in Figure 1, the movable part of the framing mechanism is provided with a lug 20 which is pivotally connected to a link 21, which latter is pivotally connected to a rocker-arm 22, said rocker arm being mounted upon a suitable fulcrum 23, which, as shown in Figure 2, includes a bolt 24 fixedly mounted in a suitable opening 25 in one side of the frame F, and provided with an enlarged sleeve portion 26 thereon for supporting the hub 27 of the rocker arm 22.

The inner ends of the sleeve 26 and hub 27 abut a carrier plate 28, disposed between said hub and the frame F, and the outer end of the sleeve 26 is provided with an enlarged head 29 which serves as a bearing for the manipulating shaft 30, which latter operates in a transverse opening 31 in said head.

The hub 27 is provided with a segmental beveled gear 32, preferably the spiral form, which meshes with a complemental spiral beveled pinion 33 secured to and rotatable with the shaft 30. The shaft 30 at its inner end is supported in a bearing bracket 34 provided with a recess 35 and an opening 36 for reception of the shaft, said bearing bracket 34 passing through the plate 28 and being secured by a nut 37 to the frame F.

The gear 32 and pinion 33 are preferably spiral in form for the reason that the desired velocity ratio may be obtained without material changes in the mechanism.

The outer end of the bearing bracket 34 is maintained rigid by the provision of a strap 38 extending between said bracket and the head 29, said strap being secured in position by the nuts 39.

Between the pinion 32 and the bearing bracket 34, I provide a friction spring 40 which surrounds the shaft 30 and abuts said pinion and a plate 41 seated in the recess 35. The spring 40 tends to maintain the pinion 33 in mesh with the segmental gear 32 and the shaft 30 is prevented against longitudinal movement to the left by said spring cooperating with an annular abutment 42 carried by the shaft and engaging the head 29. The abutment 42 is enlarged and provided with a socket 43 which receives a removable handle member 44 provided with a handle 45 whereby the shaft 30 may be rotated for imparting oscillating movement to the rocker arm 22 and thus adjusting the framing mechanism.

In the alternative form of the invention shown in Figures 5 to 7, the framing device 19a is shown provided with a lug 20a connected by a link 21a to a rocker arm 22a, the latter being provided with a hub portion 23a rotatable upon a fulcrum bolt 24a fixedly secured in the frame F as indicated at 25a. The hub 23a is connected to a worm gear 46 rotatable on the fulcrum 24a by the provision of a connecting key in the form of a screw 47 as shown in Figure 6, and said pinion is maintained in such engagement by the provision of a friction spring 48 interposed between the head 49 and the fulcrum 24a and said worm gear shown in Figure 6.

The fulcrum 24a also serves to support in part a carrier frame 50 which has a portion 51 thereof disposed between the arm 22a and the frame F, said frame 50 being further fixedly secured in position by the provision of an integral hollow standard 50 through which a retaining bolt 52 extends, said bolt being secured in said standard and in the frame F by the provision of retaining nuts 53 and 54.

For imparting movement to the worm gear 46 for oscillating the rocker arm 22a, I provide an actuating shaft 55 rotatably mounted in a bearing member 56 fixedly carried by the frame 50, said shaft having a worm 57 fixedly secured thereto and in operative engagement with the worm gear 46, said pinion abutting one end of the bearing 56, and a collar 58 on said shaft 55 abutting the other end of said bearing to prevent longitudinal displacement of the shaft 55.

The shaft 55 is enlarged as at 59 to receive a handle member 60 similar to the handle 44, whereby rotation of the shaft 55 may be readily accomplished for oscillating the rocker arm 22a and thus adjusting the framing mechanism.

In the forms of my invention shown in Figures 1 to 7 it will be understood that in adjusting the framing mechanism, the shutter compensating mechanism is also adjusted to synchronize the shutter with the "frame" and this may be accomplished by suitable connections such as those shown in the application referred to.

Figure 9:
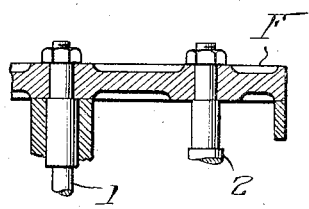

Referring now to Figures 8 and 9, which are in part a form of prior art structure, the conventional frame F supports the picture framing mechanism illustrated in part at 19b of conventional form and the latter in my invention is provided with the lug 61 connected by a link 62 to a rocker arm 63, said rocker arm having an offset portion 64 which is employed as a stop to engage a part 65 of said frame F on the said rocker arm, being pivotally mounted on a suitable fulcrum 66 attached to the frame F.

Means for actuating the rocker arm through its complete arc of displacement by functioning so as to reduce the required amount of movement of such actuating means includes the lever 67 mounted on a suitable fulcrum 68 provided on the frame F, said lever being bent as at 69 to avoid premature contact with the fulcrum 66 and also to permit interchangeability of the mechanisms of Figures 1 to 7 with the device of Figure 8. The lever 67 is provided with a handle member 70 by which said lever may be displaced about the fulcrum and a link 71 is pivotally connected at 72 to the lever 67 and at 73 to the rocker arm 63 whereby to connect these elements for simultaneous displacement.

It will be observed that a displacement vertically of the lever 67 to a predetermined arc will impart movement in the same direction to the lever 63 but cause said lever to be displaced to a greater distance due to the provision of the reducing link 71, thus performing an analogous function to that performed by the devices shown in Figures 1 to 7. It will be observed that all of the devices of Figures 1 to 7 are applicable to the frame F shown in Figure 9 without alteration thereof, the various elements and forms of the structure being interchangeable, that is, the fulcrums 66 and 68 correspond to the parts 24a and 52 of Figures 5 to 7 and also correspond to the fulcrums 26 and 34 of Figures 1 to 4, so that substitution of one of the improved forms of the actuating mechanism for another form or for the prior art device does not require any alteration in the frame F, or any material alteration in the location of the fulcrums or bearings employed, thus affording an improved structure which may be readily applied to the existing frame.

Figure 10:
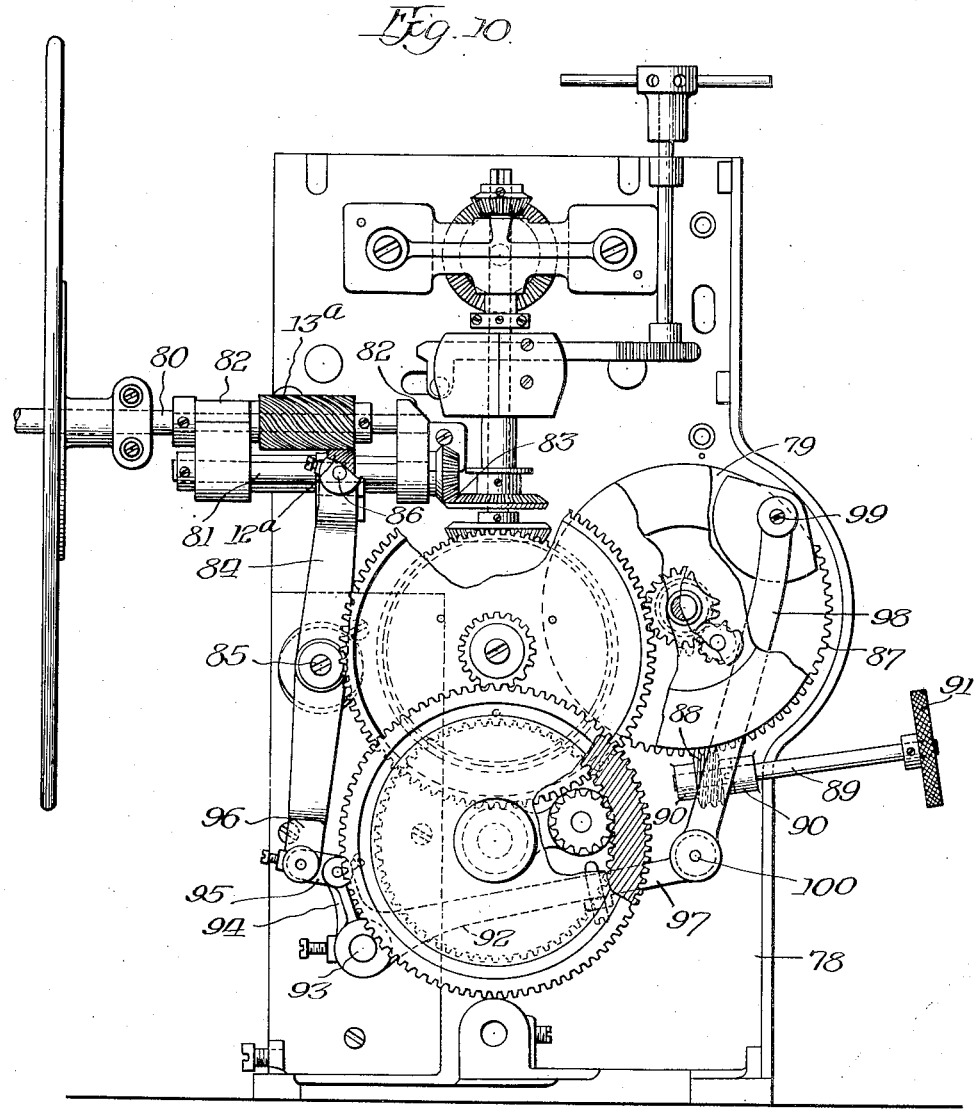
Figure 10 is an alternative form of my invention.

Referring now to the form of the invention shown in Figure 10, the supporting frame 78 of a motion picture projector similarly to that shown in Figure 1 is provided with a gear box 79 and with a shutter shaft 80. The shutter shaft 80 is driven from a counter shaft 81, these two shafts being mounted in suitable bearings 82, 82. Spiral gears 12a and 13a serve to transmit motion between the shafts 81 and 80, the shaft 81 being driven in the usual manner through bevel gearing 83.

As explained in connection with Figure 1, the timing of the shutter is changed by reciprocating the gear 12a on the shaft 81, and this is accomplished by the provision of a lever 84 having a fulcrum and having a yoke connection 86 with said pinion 12a. Oscillation of the lever 84 causes the pinion 12a to be reciprocated on the shaft 81.

The gear box 79 is adapted to be rotated in order to change the framing of the picture in the manner commonly understood and for imparting rotation to said gear box, I provide a series of gear teeth 87 which mesh with a worm 88 rotated by the provision of a shaft 89 mounted in bearings 90, 90 beneath the gear box. A suitable handle 91 is carried by the outer end of the shaft 89 for imparting rotation to said worm 88 and thereby revolving the gear box 79.

In order to synchronously operate the shutter with the framing mechanism, I provide a connecting rocker arm lever 92 having a fulcrum at 93 substantially immediately beneath the gearing 12a and 13a, one arm 94 of said lever being pivotally connected by the provision of a link 95 with the lower end 96 of the lever 84. The other arm 97 of said lever 92 is extended beneath the gear box and is provided with a laterally angularly disposed extension 98 pivotally connected at 99 with the gear box 79. The lateral extension 98 of the lever 97 is angularly adjustable relatively thereto and its adjustment may be maintained fixed, if desired by the provision of a set screw 100. The fulcrum 85 of the lever 84 is shiftable to vary the stroke of the lever 84, the structure being shown merely diagrammatically in Figure 10 as will be obvious from an inspection of the drawings.

Having thus described my invention and illustrated its use, what I claim as new and desire to secure by Letters Patent is:

1. In a device of the character described, in combination, a revoluble element, gearing for imparting rotation thereto, a rocker arm having one end pivotally connected to said revoluble element, relatively movable gear members one of which is adapted to actuate a shutter, and a lever for moving one of said gear members and having a pivotal connection at one end to said rocker arm.

2. In a motion picture projector having a revoluble framing element and a shutter, gearing for imparting rotation to said framing element, a rocker arm having one end pivotally connected to said revoluble framing element, relatively movable gear members for driving said shutter, and a connection between one of said gears and said rocker arm for simultaneously moving said gear and framing device.

3. In a motion picture projector having a revoluble framing element and a shutter, gearing for imparting rotation to said framing element, relatively displaceable gears for driving said shutter, a rocker arm pivotally connected at one end to said framing element, and a lever forming a pivotal connection between the opposite end of said rocker arm with one of said gears.

4. In a motion picture projector having a revoluble framing element and a shutter, gearing for imparting rotation to said framing element, relatively displaceable gears for driving said shutter, a rocker arm pivotally connected at one end to said framing element, and a lever pivoted at its medial portion and having one end connected to one of said gears and the other end having a pivotal connection to said rocker arm.

5. In a motion picture projector having a film feeding mechanism a revoluble framing element and a shutter, gearing for imparting rotation to the framing element, relatively displaceable gears for driving said shutter, a rocker arm pivoted below said film feeding mechanism, a connecting lever mounted on a displaceable fulcrum and extending between and connecting one end of said rocker arm to one of said displaceable gears, and a link pivotally connecting the opposite end of said rocker arm to a revoluble part of said framing mechanism.

In testimony whereof I have hereunto signed my name.

AUGUSTO DINA.